United States Patent Office 2,785,185
Patented Mar. 12, 1957

2,785,185

PROCESS FOR MAKING OXIRANE COMPOUNDS FROM OLEFINS AND ALDEHYDE MONOPER- ACYLATES

Benjamin Phillips and Paul S. Starcher, Charleston, W. Va., assignors to Union Carbide and Carbon Corporation, a corporation of New York No Drawing. Application August 7, 1952, Serial No. 303,152

12 Claims. (Cl. 260—348.5)

This invention relates to compounds containing the oxirane group or three-membered epoxide ring,

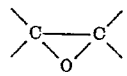

More particularly, it is concerned with an improved process for making oxirane compounds with the reaction product of acetaldehyde and oxygen.

It is known that epoxides can be prepared from olefines by the addition of hypochlorous acid to the double bond followed by treatment with alkali to remove the elements of hydrogen chloride. Because the hypochlorination step works well only in special cases, as for instance with normally gaseous olefines or with unsaturated compounds having an appreciable solubility in water, the process is not of general applicability. To make chlorohydrins from water-insoluble olefines, chlorourea has been used, but this process is more costly than the chlorohydrin process which, itself, requires a mol of chlorine and two mols of base for each mol of epoxide formed. The epoxidation of unsaturated compounds with perbenzoic acid has also been suggested. This method is of general applicability with good yields of epoxides but because an inexpensive source of perbenzoic acid is lacking, it can not compete in costs with a process based on oxidizing an ethylenic compound with oxygen either directly or through an inexpensive oxygen carrier.

Epoxides are valuable intermediates for the synthesis of a wide variety of organic chemicals. By reason of their great reactivity they can be caused to combine with water, alcohols, acids, phenols, amines, mercaptans and other compounds containing "active hydrogen." They can also be isomerized to carbonyl compounds, hydrogenated to alcohols, and made to undergo the Friedel-Crafts reaction with aromatic compounds. Some epoxides are useful intermediates in the synthesis of resins and lubricants, while others can be employed as solvents, plasticizers, pesticides and in a variety of other applications. The lack of a low-cost synthesis for the epoxides except in the case of ethylene oxide has limited their commercial availability, however.

The present improvement is based upon our discovery that epoxides are produced upon reacting an ethylenic compound with a product which in its turn is formed by the oxidation of the saturated aliphatic aldehydes having from two to three carbon atoms to the molecule, namely acetaldehyde and propionaldehyde. Although the mechanism of our new epoxide synthesis is not known with certainty, in a sense, it might be possible to regard the aldehyde as functioning as an oxygen carrier. However, the invention should not be considered as being limited by any particular theory or explanation of the mechanism. For convenience in describing the invention, reference will be had more particularly to acetaldehyde and the oxidation thereof by way of illustration.

When acetaldehyde is reacted with oxygen, the initial product is a peroxide. If the reaction is carried out at a temperature above 20° C., or if certain catalysts (for instance, manganese ions, water or the like) are present, the peroxide as it is formed decomposes with formation of acetic acid. By conducting the oxidation of acetaldehyde at a temperature not higher than 15° C., for instance at 0° C., and in the absence of a catalyst favoring the formation of acetic acid, the peroxide is formed with high efficiency to the virtual exclusion of acetic acid as a product. When the oxidation of acetaldehyde is conducted to a high degree of conversion under such conditions, the peroxide crystallizes from unoxidized acetaldehyde in the form of colorless needles. As with other crystalline peroxides, these peroxide crystals are sensitive to shock, and merely the stirring of a slurry of the crystals can result in an explosion. By the use of a solvent which keeps the peroxide crystals in solution, the possibility of such an explosion is avoided. Acetone, acetic acid, cyclohexanone, methyl ethyl ketone, ethyl acetate and butyl acetate are illustrative of solvents useful for this purpose.

Because of the difficulties of purifying and weighing this unstable peroxide, an absolute proof of its structure is lacking. However, on the basis of our present information, it appears that this peroxide, initially formed by the reaction of acetaldehyde with oxygen at low temperature, can be represented by the following formula:

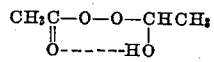

This structure, as will be noted, is analogous to that of a hemiacetal; and, accordingly, the compound may be regarded as the addition product of acetaldehyde and peracetic acid. For convenience, but without wishing to be bound to any particular theory or structure, it will be referred to herein as acetaldehyde monoperacetate.

Acetaldehyde monoperacetate crystals melt at a temperature of 20°-22° C., well above the melting point of pure peracetic acid which melts at 0° C. Also, acetaldehyde monoperacetate is less stable at room temperatures than peracetic acid. When the crystals of acetaldehyde monoperacetate are allowed to warm up to room temperature, a vigorous reaction ensues and the temperature of the molten material rises in a few seconds to over 100° C. If external cooling is applied to slow down the reaction rate, no gas is evolved, and the end product is an equal weight of acetic acid of about 98 percent purity. From this equal weight relationship in the conversion of acetaldehyde monoperacetate to acetic acid, it must follow that both have the same carbon, hydrogen and oxygen analysis. Additional evidence bearing on the structure of acetaldehyde monoperacetate is the fact that the reaction of acetaldehyde with oxygen at low temperatures comes to a standstill when one mol of oxygen has been consumed for each two mols of acetaldehyde.

The acetaldehyde monoperacetate is produced by diffusing oxygen into acetaldehyde at a temperature below 15° C. A temperature of about —5° C. is preferred. If desired, the oxygen may be in admixture with non-reactive gases. For instance, air can be used. As set forth above, when the oxidation is carried to a high degree of conversion the possibility of explosion is avoided by the use of a solvent which keeps the peroxide crystals in solution. The solution of acetaldehyde monoperacetate must, of course, be kept cold since a vigorous reaction occurs with formation of acetic acid, if it is allowed to warm up to room temperature. A storage temperature of 0° C. and below is preferred.

The oxidation of acetaldehyde to acetaldehyde monoperacetate is best carried out in the presence of a catalyst. Salts of the heavy metals, for instance of cobalt, copper, iron and the like, are powerful catalysts for this reaction.

At the same time, however, the presence of metal salts decreases the stability of the peroxide that is formed and often causes side reactions during subsequent use of the peroxide. For good results the amount of metal salt should not exceed 5.0 percent based on the acetaldehyde. On the other hand, an amount less than 0.0001 percent based on the aldehyde has not been found to be effective as a catalyst. An amount which is about 0.01 percent is preferred. The reaction can also be catalyzed by irradiating the acetaldehyde with ultraviolet light or by a small amount of ozone in the oxygen, which are preferred.

In utilizing acetaldehyde monoperacetate for the production of epoxides or oxirane compounds in accordance with the present invention, it is not necessary first to separate it from the solution. The peroxide in solution can be reacted in either the liquid or vapor phase with the ethylenically unsaturated compound that is to be oxidized. The reaction that takes place can be represented graphically by the following equation:

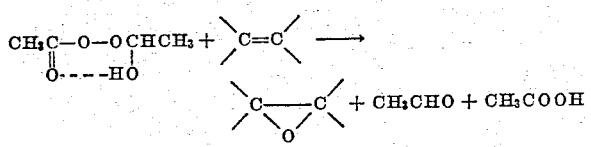

As will be noted from this equation, a mol of acetaldehyde and a mol of acetic acid are also formed for each mol of epoxide or oxirane compound produced. Here again, without wishing to be bound to any particular theory or mechanism, acknowledgement is made that it might be possible to explain the reaction by a mechanism involving the decomposition of the acetaldehyde monoperacetate to acetaldehyde and peracetic acid, followed by epoxidation of the ethylenic compound with the peracetic acid thus formed. The aldehyde can be recovered and reused for the production of additional acetaldehyde monoperacetate, and the acetic acid can be used as an intermediate or sold.

The temperature for the reaction between the acetaldehyde monoperacetate and the ethylenic compound is not narrowly critical. Temperatures ranging from about 25° C. to about 200° C. can be used; the temperature in a particular case being selected according to the compound being epoxidized. Temperatures of the range of 40° C. to 120° C. are preferred. A preferred procedure is to conduct the reaction in the liquid phase by feeding the cold solution of acetaldehyde monoperacetate into a heated reaction mixture comprising the ethylenic compound. No catalyst is required for the reaction.

Along with the production of the epoxide, some of the acetaldehyde monoperacetate is converted to acetic acid, as illustrated by the following equation:

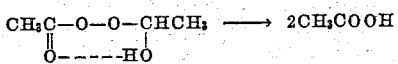

In order to limit the extent of this competing reaction, we prefer to carry out the epoxidation reaction in the presence of more ethylenic compound than is required by theory to react with the amount of acetaldehyde monoperacetate present in the reaction mixture. Also, when feasible, we prefer to remove acetaldehyde from the reaction mixture continuously, as it is formed, as for instance by rectification or extraction. Analogously, when a diepoxide is to be produced from a diolefinic compound, as for instance, diepoxybutane from butadiene, it is usually desirable to make the monoepoxide first and then to oxidize it in a second step to the end that an excess of the olefinic compound can be used for each step.

Because acetic acid is also a product of the main reaction, and because it can destroy epoxides by opening the rings, it is sometimes desirable to remove it from the reaction mixture as fast as it is formed, as for instance by distillation or extraction. It should be borne in mind, however, that in the absence of a catalyst most of the epoxides are resistant to the ring-opening action of acetic acid. Hence, it does not always follow that advantage is to be gained by the removal of the acetic acid. Any tendency of the olefinic compound to polymerize during the epoxidation reaction can be almost completely eliminated by the addition of a small amount of polymerization inhibitor, such as for instance, hydroquinone, pyrogallol, dinitrophenol, phenyl-beta-naphthylamine, and the like.

The separation of the epoxides from the reaction mixture can be effected by known expedients. Fractional distillation will be found useful for many epoxides but with epoxides of high molecular weight, it may be found preferable to employ crystallization techniques or to obtain the epoxide as a residue product by distilling off the lower boiling components of the reaction mixture.

A wide variety of olefinically unsaturated compounds can be epoxidized by acetaldehyde monoperacetate by our improved process. Certain substituents and groupings are known to be helpful, while others appear to interfere. The results of our tests can be summarized as follows:

*Olefines.*—Olefinic hydrocarbons except ethylene react readily with acetaldehyde monoperacetate to give the epoxide. In general, the relative ease of oxidation is about the same as for oxidation with peracetic acid. The presence of alkyl groups on the olefinic carbon atoms, $>C=C<$, increases rather than decreases the reaction rate. Aryl groups also increase the rate of the reaction. A halogen atom directly attached to either of the ethylenic carbon atoms prevents the epoxidation from taking place, but halogen atoms removed from the ethylenic carbon atom by one or more carbon atoms do not prevent epoxidation although they still can exert a retarding effect on the reaction rate.

*Olefinically unsaturated compounds also containing a carbonyl group.*—Keto groups wherein the carbonyl group, $>C=O$, is not conjugated with the ethylenic group do not interfere with the epoxidation of the latter. Aldehyde groups, —CHO, not conjugated with the ethylenic group likewise do not interfere with the epoxidation of the latter, but some oxidation of the aldehyde group to a carboxyl group also takes place. Nor do carboxyl groups which are not conjugated with the olefinic group interfere with the epoxidation of the latter provided the temperature is kept low enough to avoid excessive ring opening of the oxirane product. However, unsaturated carbonyl compounds in which the ethylenic unsaturation is conjugated with the carbonyl group (alpha, beta unsaturated aldehydes; alpha, beta unsarutated ketones; alpha, beta unsaturated acids), and their functional derivatives (esters, acetals and the like), do not in general undergo epoxidation with acetaldehyde monoperacetate, except when a nonconjugated ethylene group is additionally present. An exception is mesityl oxide in which the retarding effect of a conjugated carbonyl group is partially offset by the favorable influence of two methyl groups to result in a low yield of epoxide. However, conjugated diolenific compounds, for instance butadiene, can be epoxidized.

Vinyl ethers, $CH_2=CHOR$, and vinyl esters

react readily with acetaldehyde monoperacetate, but the final products are not epoxides.

As far as is known, aromatic unsaturation can not be epoxidized by our process.

Restated in other words, the essential characteristics of the compounds which can be epoxidized by our process are that they contain at least three carbon atoms and have one or more aliphatic double bonds, $>C=C<$, in which the atoms directly joined to the ethylenic carbons are hydrogen or carbon. More specifically, the compounds which can be epoxidized by our process are hydrocarbons, halogenated hydrocarbons, alcohols, ethers, aldehydes, ketones, acetals, ketals, acids, esters, amides, imides, nitriles and phosphoric esters, which compounds are characterized by having at least one aliphatic double bond and being free of elements other than carbon, hydrogen, oxygen, nitrogen in the form of amido, imido, or cyano groups, phosphorus in the form of phosphoric esters, and halogens, and wherein the atoms joined to the >C=C< group to be epoxidized are of the group consisting of hydrogen and only such carbon atoms as have not more than one bond thereof in linkage to elements other than carbon or hydrogen. The following compounds are illustrative:

HYDROCARBONS

Propylene
Butylenes
Pentenes
Hexenes
Heptenes
Octenes
Butadiene
Isoprene
Pentadienes
Hexadienes
Heptadienes
Octadienes Styrene
Vinylcyclohexenes
Divinylbenzenes
Dihydronaphthalenes
Indene
Stilbene
1-phenyl-1-propene
1,1-diphenylethylene
Cyclopentene
Cyclopentadiene
Dicyclopentadiene
Methyl cyclopentene
Methylene cyclohexane and the like up to and including unsaturated macromolecules such as butadiene polymer and copolymers

CHLORINATED HYDROCARBONS

Allyl chloride
Methallyl chloride
1,4-dichloro-2-butene
3,4-dichloro-1-butene
3-chloro-1-butene
Crotyl chloride
Crotyl fluoride
Crotyl bromide
o-Chlorostyrene
p-Chlorostyrene
m-Chlorostyrene
Chloromethyl styrenes (ortho, meta and para)
1-chloro-3-vinylcyclohexane
4-(trichloromethyl)-1-cyclohexene
Tetra-(chloromethyl)-ethylene
1-chloro-4-fluoro-2-butene
p-Bromobenzylethylene

ALCOHOLS AND PHENOLS

Allyl alcohol
Cinnamyl alcohol
3-cyclohexenyl methanol
p-Allyl phenol
p-Crotyl phenol Dicrotyl phenols
4-methylenecyclohexanol
3-penten-1-ol
5-decen-1-ol
9-octadecen-1-ol

ETHERS

Diallyl ether of diphenylol methane
Diallyl ether of 2,2-diphenylol propane
Diallyl ether
Butyl crotyl ether
2-pentenyl butyl ether
4-pentenyl butyl ether
o-Allylphenyl ethyl ether
2,4-diallylphenyl ethyl ether
3-cyclohexenylmethyl alkyl ethers
3-cyclohexenylmethyl aryl ethers

UNSATURATED CARBONYLIC COMPOUNDS (UNSATURATED ALDEHYDES, KETONES, ACIDS, ESTERS)

Oleic acid
Soybean oil
Linseed oil
Mesityl oxide
Allyl acetate
3-cyclohexenylmethyl esters
3-cyclohexenylmethyl acetate
3-cyclohexenmethyl acrylate
3-cyclohexenmethyl methacrylate
2-ethylhexyl oleate
Glycol dioleate
p-Vinyl benzaldehyde
4-decenoic acid
Methyl allyl ketone
Methyl-2-pentenyl ketone
Diallyl maleate

UNSATURATED NITROGEN-CONTAINING COMPOUNDS (UNSATURATED AMIDES, IMIDES, NITRILES)

3-pentenenitrile
4-pentenenitrile
4-cyanocyclohexene
Vinylbenzonitriles (ortho, meta and para)
3-pentenamide
4-pentenamide
Oleamide
Vinylbenzamides (ortho, meta and para)
3-cyclohexene-1-carboxamide
N-crotylmaleimide
N-crotylphthalimide
N-allylphthalimide

UNSATURATED ACETALS 4-pentenaldehyde diethyl acetal
1,2,5,6-tetrahydrobenzaldehyde diethyl acetal
3-hexendial tetramethyl acetal
p-Vinylbenzaldehyde dibutyl acetal
Acetaldehyde diallyl acetal

UNSATURATED PHOSPHORIC ESTERS

Di-(2-butenyl)2-ethylhexyl phosphate
Tri-(crotylphenyl)phosphate
Allyl diphenyl phosphate
Dioctyl 3-pentenyl phophate The invention is further illustrated by the following examples:

Example 1

Oxygen was introduced through a diffuser into acetaldehyde, 176 parts, which was contained in a cylindrical oxidizer maintained at a temperature of −3° C. to 0° C. During the diffusion, the acetaldehyde was irradiated with ultraviolet light. The oxygen was rapidly absorbed and an exothermic reaction occurred.

At the end of 3½ hours, the supply of oxygen was cut off and the reaction stopped. The reaction mixture was found by analysis to contain 64.4 percent of acetaldehyde monoperacetate, 0.7 percent of acetic acid and the remainder unreacted acetaldehyde. The conversion was 57.2 percent and the chemical efficiency was 99 percent. No tendency for the acetaldehyde monoperacetate to crystallize was observed, if the temperature was maintained above −5° C.

Example 2

Three hundred fifty-one grams of a solution mixture of acetaldehyde (75 percent) and acetone (25 percent) were charged to a cylindrical oxidizer and cooled to −4° C. The solution mixture was irradiated with ultraviolet light and oxygen forced through the solution at the point near the bottom of the oxidizer, by means of a diffuser. At the end of two hours, the concentration of acetaldehyde monoperacetate in the solution was found by analysis to be 46 percent.

At this point, fresh acetaldehyde-acetone mixture of the same composition as used above was fed into the top of the oxidizer. At the same time, oxidized product was removed from near the bottom of the oxidizer through a discharge line which was elevated so as to maintain a constant level of solution in the oxidizer.

Over a period of 490 minutes, 1074 grams of acetaldehyde-acetone mixture were fed (167 milliliters per hour) into the oxidizer, and 1230 grams of a peroxide solution found by analysis to contain 45 percent of acetaldehyde monoperacetate were removed. The conversion was 50 percent. Throughout the run, the temperature was maintained at about −4° C.

*Example 3*

A mixture of 704 grams of acetaldehyde and 704 grams of ethyl acetate was charged to a stainless steel cylindrical oxidizer and cooled to −2° C. By means of a diffuser, oxygen was introduced into the mixture near the bottom of the oxidizer, and the mixture irradiated with ultraviolet light from an internal light source. The rate of oxygen absorption at the start was 50 liters per hour. At the end of 3.5 hours the absorption rate had decreased to 22 liters per hour, when the reaction was terminated.

The product was found, upon analysis, to have an acetaldehyde monoperacetate content of 38 percent, and no acetic acid. The conversion was 60 percent and the chemical efficiency was practically 100 percent.

*Example 4*

A mixture of 2528 grams of acetaldehyde and 845 grams of glacial acetic acid was charged to a cylindrical stainless steel oxidizer and cooled to 0° C. Oxygen was introduced into the mixture at a point near the bottom of the oxidizer by means of a diffuser, and the mixture irradiated wtih ultraviolet light. The temperature was maintained at 0° C. to 3° C. during the reaction, and the rate of oxygen absorption varied from a maximum of 250 liters per hour during the run to a minimum of 100 liters per hour at the end of the run. At the end of 70 minutes, the reaction was stopped and the product analyzed. It was found to contain 46.7 percent acetaldehyde monoperacetate, corresponding to a conversion of 53.4 percent.

*Example 5*

A mixture of 300 grams of acetaldehyde and 100 grams of glacial acetic acid was charged to a cylindrical glass oxidizer and cooled to 0° C. The mixture was irradiated with ultraviolet light, and oxygen introduced into the liquid at a point near the bottom of the oxidizer, by means of a diffuser, at the rate of 25 liters per hour. A cold methanol-water mixture was circulated through a jacket surrounding the oxidizer to cool the liquid and maintain it at a temperature of about 0° C. to 4° C. The reaction was terminated at the end of 170 minutes.

The product was found, by analysis, to contain 52.6 percent of acetaldehyde monoperacetate, corresponding to a conversion of 59.5 percent.

*Example 6*

Oxygen containing approximately 1.5 percent of ozone, by weight, was introduced into a mixture of 264 grams of acetaldehyde (6 mols) and 87 grams of dry acetone (1.5 mols), maintained at a temperature of −5° C. to −3° C. The mixture was contained in a cylindrical glass oxidizer and the oxygen introduced through a diffuser at a point near the bottom of the oxidizer. The mixture was not irradiated with ultraviolet light during the reaction. The rate of oxygen absorption was 18 liters per hour at the start. At the end of 2.5 hours it had decreased to 8 liters per hour, at which time the reaction was stopped. Upon analysis, the product was found to contain 45 percent of acetaldehyde monoperacetate and 1.8 percent of acetic acid. The conversion was 52 percent.

*Example 7*

A mixture of 280 grams (6.4 mols) of acetaldehyde, 94 grams of acetone (1.6 mols) and 0.037 gram of cobalt acetate was charged to a cylindrical glass oxidizer, and cooled to a temperature of −4° C. Oxygen was introduced into the mixture by means of a diffuser at a point near the bottom of the oxidizer. The mixture was not irradiated with ultraviolet light during the reaction. The rate at which the oxygen was absorbed was 31 liters per hour at the start and 14 liters per hour after 140 minutes, when the reaction was stopped.

The product was found, by analysis, to contain 61.9 percent of acetaldehyde monoperacetate and no acetic acid. The conversion was 72.4 percent and the chemical efficiency was practically 100 percent.

*Example 8*

A mixture of 264 grams of acetaldehyde (6 mols) and 87 grams of acetone (1.5 mols) was charged to a cylindrical glass oxidizer, cooled to −6° C., and irradiated with ultraviolet light. Air was introduced into the mixture at a point near the bottom of the oxidizer, by means of a diffuser. The rate at which air was supplied was so regulated as to keep the oxygen content of the blow-off gas below 3 percent. After two hours the product was found by analysis to contain 28.7 percent of acetaldehyde monoperacetate and no acetic acid. The conversion was 30 percent and the chemical efficiency practically 100 percent.

*Example 9*

An acetaldehyde monoperacetate solution from Example 4 was added to 120 grams (1.035 mols) of butyl acetate at a temperature of 0° C. Acetaldehyde was then removed from the mixture under a reduced pressure of 10 millimeters of mercury, absolute. The kettle temperature was maintained at 0° C. throughout the operation.

The resulting residue solution was found by analysis to contain the following:

| | Percent |
|---|---|
| Acetaldehyde monoperacetate | 48 |
| Acetic acid | 25 |
| Butyl acetate | 27 |

*Example 10*

Four hundred thirteen grams (3.95 mols) of styrene having a polymerization inhibitor (2,6-dinitro-4-chlorophenol) content of 0.8 gram was charged to a still provided with a column 2.5 feet long, packed with glass helices. The styrene was heated under a reduced pressure of 60 millimeters of mercury absolute, to maintain a kettle temperature under reflux of 70° C.

Over a period of 80 minutes, 229 grams of a solution of acetaldehyde monoperacetate of 52 percent concentration, prepared by a method similar to that of Example 2, was fed gradually to the still kettle. At the same time, a 10% solution of 2,4-dinitro phenol in styrene was fed into the top of the column, at the rate of 20 milliliters in 78 minutes, to minimize polymerization. Acetic acid, acetone, and acetaldehyde were removed continuously at the top throughout the run.

Distillation of the kettle material under reduced pressure gave 86 grams of styrene oxide having a boiling temperature of 54° C. at an absolute pressure of 3 millimeters of mercury and a refractive index ($n_D^{30}$) of 1.5305. There was also recovered 330 grams of unreacted styrene. The conversion based on acetaldehyde monoperacetate was 72.5 percent and the chemical efficiency based on styrene was 92 percent.

Example 11

A stainless steel still was charged with 4244 grams (39.2 mols) of 4-vinyl-1-cyclohexene containing 0.2 percent by weight of t-butylcatechol. The material was heated and maintained at its refluxing temperature under a pressure so adjusted as to give a kettle temperature of 70° C. Over a period of 3.5 hours, 2469 grams of a solution of acetaldehyde monoperacetate of 45 percent concentration and prepared by a procedure similar to that of Example 2 was introduced into the still kettle. Acetaldehyde, acetone, and acetic acid were removed continuously at the top or head during the run.

At the end of the run, distillation of the reaction mixture under reduced pressure gave 801 grams of vinylcyclohexene monoxide, having a boiling temperature of 57° C. at an absolute pressure of 9 millimeters of mercury and a refractive index ($n_D^{30}$) of 1.4665. The conversion, based on acetaldehyde monoperacetate, was 70 percent. The chemical efficiency based on vinylcyclohexene was 92 percent.

Example 12

Five hundred eighteen grams (4.17 mols) of vinylcyclohexene monoxide was diluted with an equal weight of ethylbenzene. The mixture was heated to a kettle temperature of 70° C., at a reduced pressure of 35 millimeters of mercury absolute, in a still provided with a reflux column four feet long. Over a period of 340 minutes, 1059 grams of a solution of acetaldehyde monoperacetate of 47.5 percent concentration and prepared by a procedure similar to that of Example 2 was fed into the still kettle. Acetaldehyde, acetone, and acetic acid were continuously removed at the still head or top throughout the run.

At the end of the run, vinylcyclohexene dioxide, a colorless liquid boiling at 73° C. at an absolute pressure of 2.5 millimeters and having a refractive index ($n_D^{30}$) of 1.4755, was recovered upon distillation of the reaction mixture. The conversion based on acetaldehyde monoperacetate was 29 percent and the chemical efficiency based on vinylcyclohexene monoxide was 85 percent. Analysis of the product by the pyridine hydrochloride method indicated a purity of 97.4 percent.

Example 13

One thousand six hundred twenty grams of 4-vinyl-1-cyclohexene (15 mols) was cooled to 0° C. and intimately mixed with 380 grams of cold acetaldehyde monoperacetate solution of 47.6 percent concentration which was prepared in accordance with the procedure described in Example 2. This cold mixture was fed at the rate of 37 milliliters per minute into a stainless steel coiled tube (outside diameter, ⅜ inch; internal volume, 150 milliliters) which was heated to a temperature of 70° C. with hot water.

The reaction mixture was then quickly cooled to room temperature (27° C.) and distilled under reduced pressure. A total of 156 grams of vinylcyclohexene monoxide was obtained. The conversion and chemical efficiency based on acetaldehyde monoperacetate was 83.5 percent. The chemical efficiency based on vinylcyclohexene was 90.5 percent.

Example 14

Thirty mols (1262 grams) of propylene was cooled to −2° C. under pressure and then mixed with 140 grams (0.55 mols) of the solution of acetaldehyde monoperacetate in acetic acid prepared in Example 4 which had a concentration of 46.7 percent. This mixture was then fed gradually over a period of two hours into a stainless reactor tube heated with hot water to a temperature of 90° C. The reactor tube had an outside diameter of ⅜ inch, a length of 17 feet, 5 inches and an internal volume of 160 milliliters.

The material from the tube was fractionally distilled, using a column three feet in length packed with glass helices. A product cut having a boiling range of 20° C. to 40° C. at atmospheric pressure, upon analysis by the pyridine hydrochloride method, showed a yield of 15.1 grams of propylene oxide. The conversion based on the acetaldehyde monoperacetate was 47.3 percent.

Example 15

A mixture of 1032 grams of diethyl maleate, 800 grams of ethylbenzene, and 2 grams of pyrogallol was charged to a still kettle provided with a reflux column 3 feet long. The kettle was heated to a temperature of 70° C. and the pressure so adjusted that the still operated under reflux. A solution of acetaldehyde monoperacetate of a concentration of 51 percent, prepared according to the procedure of Example 2, was introduced into the kettle at the rate of 90 grams per hour until a total of 360 grams were added over a period of four hours. Acetic acid, acetone and acetaldehyde were removed at the still head throughout the run. Over the last three hours the temperature was raised to 110° C., with the aim of bringing about a reaction if at all possible.

After all the acetaldehyde monoperacetate solution had been added, the reaction mixture was distilled. Nothing boiling at a temperature higher than diethyl maleate was obtained, and an analysis of the last fraction for the presence of oxirane oxygen was negative. The failure to obtain an epoxide from diethyl maleate was attributed to the influence of the two carbonyl groups which are conjugated with the maleate double bond.

Example 16

Mesityl oxide (1178 grams; 12 mols) was charged to a still kettle, and the pressure of the system so adjusted that the still operated under reflux at a kettle temperature of 70° C. A solution of acetaldehyde monoperacetate of a concentration of 44.2 percent, prepared according to the procedure of Example 2, was introduced into the kettle at the rate of about 70 grams per hour for a total of 631 grams over a period of 4.5 hours. Acetaldehyde, acetone, and acetic acid were removed continuously at the still head throughout the addition.

Upon distillation of the kettle product there was obtained 69 grams of 3,4-epoxy-4-methyl-2-pentanone, boiling at a temperature of 65° C. at an absolute pressure of 26 millimeters of mercury and having a refractive index ($n_D^{30}$) of 1.4185. Although these obtained values for the physical properties are in agreement with those given in literature for 3,4-epoxy-4-methyl-2-pentanone, an analysis of the distilled material by the pyridine hydrochloride method indicated a purity of only 56 percent, for a 14.6 percent yield of contained epoxide.

Example 17

A mixture of 508 grams of oleic acid and 762 grams of ethylbenzene was charged to a still kettle and heated to 70° C. under reduced pressure. Over a period of five hours, 888 grams of a solution of acetaldehyde monoperacetate of a concentration of 50 percent, prepared according to the procedure of Example 2, was introduced into the still kettle. Acetone, acetaldehyde, and acetic acid were distilled out of the kettle during the addition. After completion of the reaction, the residue product was stripped free of ethylbenzene and then allowed to stand until crystallization took place. The crystalline material was filtered off and recrystallized from acetone. There was obtained 158 grams of 9,10-epoxystearic acid having a melting point of 52° C. and a purity of 99 percent. The conversion, based on oleic acid, was 29 percent. Analysis of the oleic acid filtrate by the pyridine hydrochloride method indicated an additional conversion to the epoxystearic acid of 16 percent, which was not isolated.

Example 18

To a still provided with a column having a length of 2.5 feet and packed with glass helices was charged 696 grams of allyl alcohol. The pressure was reduced and so adjusted that the kettle temperature was 70° C. as operated under reflux. Over a period of five hours, 682 grams of a solution of acetaldehyde monoperacetate of 46 percent concentration, made in accordance with the procedure of Example 2, was added to the still kettle. Acetone and acetaldehyde were removed continuously during the addition.

Upon distillation of the kettle material, there was obtained 72 grams of product boiling at 57° C. at an absolute pressure of 5 millimeters of mercury. Analysis of the distilled product by the pyridine hydrochloride method indicated a glycidol content of 50 percent.

Example 19

Methallyl chloride (817 grams; 9 mols) was heated under reflux at atmospheric pressure in a still provided with a column 3 feet in length and packed with glass helices. Over a period of 5.25 hours there was added to the kettle 376 grams of a solution of acetaldehyde monoperacetate of a concentration of 51 percent prepared by the procedure of Example 2. The kettle temperature was maintained in the range of 70° C. to 75° C. Acetaldehyde and acetone were removed continuously at the head during the run. At the conclusion of the run, the kettle material was stripped under reduced pressure of most of the unreacted methallyl chloride. The residue was diluted with an equal volume of carbon tetrachloride and washed twice with water to remove the acetic acid. Distillation of the wash material gave 183 grams of chloroisobutylene oxide boiling at 46° C. at an absolute pressure of 50 millimeters of mercury and having a refractive index ($n_D^{30}$) of 1.4268–1.4282. Analysis of the chloroisobutylene oxide by the pyridine hydrochloride method indicated a purity of 93 percent. The conversion based on acetaldehyde monoperacetate was 55 percent.

Example 20

Alkali refined soybean oil, 344 grams, having an iodine number of 138, was dissolved in 1.5 times its weight of ethylbenzene and charged to a still provided with a column four feet in length and packed with glass helices. Heat was applied and the pressure so reduced and adjusted that the kettle temperature under reflux was 70° C. Over a period of five hours, 958 grams of a solution of acetaldehyde monoperacetate of 43.5 concentration, made by the procedure of Example 2, was added to the still kettle. Acetone, acetaldehyde, and acetic acid were removed continuously at the still head throughout the run. Ethylbenzene was added to the still at intervals to maintain the kettle temperature at 70° C. At the end of the run, the reaction mixture was stripped to a kettle temperature of 125° C. at an absolute pressure of 3 millimeters of mercury. Soybean oil epoxide was obtained as a residue product in the amount of 370 grams. It was a pale yellow slightly viscous material. An epoxide analysis by the pyridine hydrochloride method showed that the product contained 6.55 percent of oxirane oxygen, and that 82 percent of the double bonds present in the original oil had been epoxidized. The conversion based on acetaldehyde monoperacetate was 44 percent.

Example 21

Three hundred ninety grams (9.28 mols) of propylene was charged to a stainless steel autoclave and heated to a temperature of 90° C. under pressure. The autoclave was of one liter capacity and was equipped with a mechanical stirrer. Over a period of twenty-one minutes, 90 grams of a solution of acetaldehyde monoperacetate of 42.6 percent concentration, prepared by the procedure of Example 2, was forced into the autoclave from a cooled feed tank where it had been kept at a temperature of 0° C. After all the solution had been added, stirring of the reaction mixture was continued for 19 additional minutes for a total reaction period of 40 minutes.

The reaction material was then fractionally distilled. The fraction boiling from 15° C. to 54° C. was found upon analysis by the pyridine hydrochloride method to contain 7.8 grams (0.134 mol), of propylene oxide, corresponding to a conversion of 42 percent, based on acetaldehyde monoperacetate.

Example 22

To a still provided with a column four feet in length was charged 920 grams (8.5 mols) of vinylcyclohexene. The pressure on the still was reduced to about 100 millimeters of mercury to maintain a kettle temperature of about 70° C. under reflux. Over a period of two hours, 246 grams of the solution of acetaldehyde monoperacetate of 61.9 percent concentration (2 mols) of Example 7 was introduced into the still kettle. Acetone, acetaldehyde, and acetic acid were distilled out continually during the run.

Upon distillation of the kettle material under reduced pressure there was obtained 130 grams (1.2 mols) of vinylcyclohexene monoxide. The conversion, based on acetaldehyde monoperacetate, was 60 percent; and the chemical efficiency based on vinylcyclohexene was 75 percent.

Example 23

A mixture of 190 grams of butadiene (3.5 mols) and 200 milliliters of acetone was charged to a stainless steel, stirrer-equipped autoclave of one liter capacity and heated to 70° C. under pressure. During a period of twenty minutes, 166 grams of a solution of acetaldehyde monoperacetate of 44.7 percent concentration (0.62 mol) was forced into the autoclave. The reaction mixture was then heated for an additional period of twelve minutes for a total reaction period of thirty-two minutes.

Upon distillation of the autoclave contents there was obtained 15 grams of butadiene monoxide (0.21 mol), corresponding to a conversion of 33 percent based on the acetaldehyde monoperacetate.

Example 24

Oxygen was introduced through a diffuser into a cylindrical glass oxidizer containing a mixture of 270 grams (6.15 mols) of acetaldehyde and 90 grams (1.55 mols) of dry acetone at a temperature of −2° C. to 0° C. The mixture was irradiated with ultraviolet light. After two hours the concentration of acetaldehyde monoperacetate was 52.8 percent. The product from the oxidizer was mixed with 300 cc. of cold dry acetone, and the mixture was distilled under reduced pressure on a one-plate column until 300 cc. of distillate was removed. At no time during the distillation was the kettle temperature above +2° C. The kettle material was analyzed and found to have the following composition: acetaldehyde monoperacetate, 51.3 percent; acetic acid, 4.0 percent; acetone, 44.7 percent.

Example 25

Propylene (1252 grams, 29.8 mols) under pressure was mixed at 0° C. with 215 grams of the acetaldehyde monoperacetate (0.9 mol) solution from Example 24 containing 0.1 percent of a partially esterified polyphosphate as stabilizer (Victor stabilizer 53). This stabilized mixture was fed through a ⅜ inch stainless steel tube 17 feet, 5 inches long having a volume of 160 milliliters at such a rate as to give a residence time of 6.5 minutes. The tube was heated during this time at a temperature of 90° C. The product from the tube was mixed with 100 grams of acetaldehyde and 200 grams of dry acetone and distilled. The fraction boiling from 20° C. to 56° C. was analyzed by the pyridine hydrochloride method and found to contain 31 grams (0.535 mol) of propylene oxide corresponding to a conversion of 60 percent, based on the acetaldehyde monoperacetate.

Example 26

Tetrahydrobenzonitrile, 642 grams (6 mols), dissolved in an equal weight of ethylbenzene, to which 0.2 gram of an organic phosphate salt of the formula $Na_5(2\text{-ethyl-hexyl})_5(P_3O_{10})_2$ ("Victawet 35B") was added as a stabilizer for the peroxide and was charged to the kettle of a still equipped with a 4-foot column packed with glass helices. The mixture was heated and the pressure reduced and adjusted so as to maintain a kettle temperature of 70° C. One hundred and eighty-six grams (1.55 mols) of acetaldehyde monoperacetate in the form of 362 grams of a 51.5 percent solution in acetone, prepared as in Example 2, was added to the still kettle at a uniform rate over a period of one hour and thirty-five minutes. Acetaldehyde, acetone, and acetic acid were removed continuously from the still head throughout the addition.

After removal of all of the acetic acid by distillation, analysis of the residue for epoxide content showed a conversion of 85 percent, based upon the acetaldehyde monoperacetate. Upon distillation of the residue there was obtained 150 grams (1.22 mols) of 3,4-epoxycyclohexanecarbonitrile which was a colorless liquid having the following properties: boiling range at an absolute pressure of 2.5 millimeters of mercury, 76° C. to 85° C.; refractive index $(n_D^{30})$ 1.4724 to 1.4736. The efficiency based on the tetrahydrobenzonitrile was 90 percent. The range of boiling temperature and of the refractive index can be accounted for by the possibility of cis- and trans-isomers of the product.

Example 27

Oleamide (81 grams, 0.288 mol) dissolved in 300 grams of ethylbenzene was heated to a temperature of 70° C. under reflux in a still equipped with a 4-foot column packed with glass helices. Acetaldehyde monoperacetate (72 grams, 0.60 mol) in the form of 155 grams of a 46 percent solution in acetone was added to the still kettle at a uniform rate over a period of 1.33 hours. Acetaldehyde, acetone, and acetic acid were removed continuously from the still head during the addition of the peroxide, and ethylbenzene was then removed by distillation, reducing the weight of the kettle material to 110 grams. The amount of 9,10-epoxystearamide present in the residue was found by analysis to be 44 percent. The yield and efficiency, based on the available active oxygen in the acetaldehyde monoperacetate, was 27 percent.

Example 28

N-(n-butyl)tetrahydrophthalimide (103 grams, 0.5 mol), dissolved in twice its weight of ethylbenzene was heated under reflux to a temperature of 70° C. in a still equipped with a 4-foot column packed with glass helices. Acetaldehyde monoperacetate (120 grams, 1 mol) in the form of a 41 percent solution in acetone, prepared similarly to that of Example 2, was added to the still contents at a uniform rate over a period of 1.5 hours. Acetaldehyde, acetone, and acetic acid were removed continuously from the still during the addition.

There was obtained a solution of N-(n-butyl)-4,5-epoxycyclohexane-1,2-dicarboximide. The amount of the epoxy compound present in the solution was found by analysis to be 57 grams (0.26 mol). The yield was 52 percent of theory, based on the starting imide. The efficiency based on the available active oxygen in the acetaldehyde monoperacetate was 26 percent.

Example 29

A mixture of 270 grams (4.7 mols) of propionaldehyde and 90 grams of dry acetone was charged to a cylindrical glass oxidizer and cooled to a temperature of −3° C. The solution was irradiated with a Westinghouse fluorescent sunlamp (40 watt) and oxygen was introduced through a diffuser into the bottom of the oxidizer. Propionaldehyde monoperpropionate was produced, the concentration thereof at the end of a period of 2.5 hours being 52.5 percent, by analysis. The conversion was 62 percent.

Example 30

Alkali-refined soybean oil, 159 grams, having an iodine number of 149, was dissolved in 318 grams of xylene and charged to a still having a 3-foot column packed with glass helices. Heat was applied and the pressure was reduced so that the kettle temperature was maintained at 75° C. Over a period of two hours, 191 grams (1.3 mols) of propionaldehyde monoperpropionate in the form of 368 grams of a 52.5 percent solution in acetone from Example 29 was added to the kettle slowly at a uniform rate. Acetone, propionaldehyde and propionic acid were removed continuously at the still head throughout the period of addition. The reaction mixture was then stripped of volatile material by heating to a kettle temperature of 105° C. and a reduced pressure of 3 millimeters of mercury absolute.

There was obtained 176 grams of soybean oil epoxide as a residue product. It was a pale yellow, slightly viscous material. Upon analysis by the pyridine hydrochloride method for epoxide content, it was found to contain 6.0 percent oxirane oxygen, showing that 70 per cent of the double bonds present in the original oil had been epoxidized. The conversion based on the propionaldehyde monoperpropionate was 50 percent of the theoretical.

In the foregoing examples the analyses for acetaldehyde monoperacetate were carried out by introducing a 1 to 1.5 gram sample of acetaldehyde monoperacetate solution into a flask containing a mixture of 60 milliliters of aqueous (50 percent) sulfuric acid and 5 milliliters of a saturated potassium iodide solution. The flask was swirled to mix the solutions and then titrated immediately with a 0.1 N aqueous sodium thiosulfate solution to a colorless end point. When a water-immiscible solvent was present in the original sample, a homogeneous solution for titration was usually obtained by the addition of acetic acid.

To determine the acetic acid, another sample of approximately the same size was taken at the same time and introduced into a flask containing 100 milliliters of water and 15 milliliters of acetaldehyde and the flask contents allowed to stand for 10 to 15 minutes, after mixing, to allow all of the acetaldehyde monoperacetate to be converted to acetic acid. The acetic acid was titrated with 0.5 N sodium hydroxide solution using a phenophthalein indicator. The amount of acetic acid present in the original sample was then taken to be equal to the total acetic acid, by titration, minus the amount of acetic acid which came from the decomposition of the acetaldehyde monoperacetate as determined in the first sample.

The analysis for the epoxide group is based upon its reaction with pyridine hydrochloride to form the chlorhydrin and pyridine. Into a pressure bottle containing 50 milliliters of 0.4 N pyridine hydrochloride was introduced a sample of epoxide calculated to use about 50 percent of the pyridine hydrochloride. The bottle was then closed and the contents heated in a steam bath for a period of two hours. At the end of that time the bottle and contents were cooled, 10 drops of bromocresol purple indicator (0.15 gram per 100 milliliters of methanol) added, and the mixture titrated to a permanent blue endpoint with standard 0.2 N alcoholic potassium hydroxide solution. A blank was also run in precisely the same fashion except that the sample was omitted.

What is claimed is:

1. A process for making oxirane compounds which comprises the steps of reacting a saturated monoaldehyde of from two to three carbon atoms with oxygen at a temperature below 15° C. to form the aldehyde monoperacylate corresponding thereto and thereafter reacting the aldehyde monoperacylate with an organic compound containing at least three carbon atoms and at least one ethylenic group, >C=C<, in the liquid phase at a temperature between 25° C. to about 200° C.; said ethylenically unsaturated organic compound being of the group consisting of hydrocarbons, halogenated hydrocarbons, alcohols, ethers, aldehydes, ketones, acetals, ketals, acids, esters, amides, imides, nitriles and phosphoric esters and said ethylenically unsaturated compounds being free of elements other than carbon, hydrogen, oxygen, nitrogen except in the form of amido, imido and cyano groups, phosphorus except in the form of phosphoric esters, and halogens; and wherein the atoms joined to the ethylenic group, >C=C<, to be epoxidized are of the group consisting of hydrogen and only such carbon atoms as have not more than one bond thereof in linkage to elements other than carbon or hydrogen.

2. A process for making oxirane compounds which comprises the steps of reacting acetaldehyde in solution in an inert solvent with oxygen at a temperature below 15° C. to form acetaldehyde monoperacetate and thereafter reacting the acetaldehyde monoperacetate with an organic compound containing at least three carbon atoms and at least one ethylenic group, >C=C<, in the liquid phase at a temperature between 25° C. to about 200° C.; said ethylenically unsaturated organic compound being of the group consisting of the following hydrocarbons: propylene, butylenes, pentenes, hexenes, octenes, butadiene, isoprene, pentadienes, hexadienes, heptadienes, octadienes, styrene, vinylcyclohexenes, divinylbenzenes, dihydronaphthalenes, indene, stilbene, 1-phenyl-1-propene, cyclopentene, cyclopentadiene, dicyclopentadiene, methyl cyclopentene, methylene cyclohexane, up to and including ethylenically unsaturated macromolecules of butadiene polymers and copolymers; the following chlorinated hydrocarbons: allyl chloride, methallyl chloride, 1,4-dichloro-2-butene, 3,4-dichloro-1-butene, 3-chloro-1-butene, crotyl chloride, crotyl fluoride, crotyl bromide, o-chlorostyrene, p-chlorostyrene, m-chlorostyrene, chloromethyl styrenes (ortho, meta and para), 1-chloro-3-vinylcyclohexane, 4-(trichloromethyl)-1-cyclohexene, tetra-(chloromethyl)-ethylene, 1-chloro-4-fluoro-2-butene, p-bromobenzylethylene; the following alcohols and phenols: allyl alcohol, cinnamyl alcohol, 3-cyclohexenyl methanol, p-allyl phenol, p-crotyl phenol, dicrotyl phenols, 4-methylenecyclohexanol, 3-penten-1-ol, 5-decen-1-ol, 9-octadecen-1-ol; the following ethers: diallyl ether of diphenylol methane, diallyl ether of 2,2-diphenylol propane, diallyl ether, butyl crotyl ether, 2-pentenyl butyl ether, 4-pentenyl butyl ether, o-allylphenyl ethyl ether, 2,4-diallylphenyl ethyl ether, 3-cyclohexenylmethyl alkyl ethers, 3-cyclohexenylmethyl aryl ethers; the following carbonylic compounds: oleic acid, soybean oil, linseed oil, mesityl oxide, allyl acetate, 3-cyclohexenylmethyl esters, 3-cyclohexenylmethyl acetate, 3-cyclohexenmethyl acrylate, 3-cyclohexenmethyl methacrylate, 2-ethylhexyl oleate, glycol dioleate, p-vinyl benzaldehyde, 4-decenoic acid, methyl allyl ketone, methyl-2-pentenyl ketone, diallyl maleate; the following nitrogen-containing compounds: 3-pentenenitrile, 4-pentenenitrile, 4-cyanocyclohexene, vinylbenzonitriles (ortho, meta and para), 3-pentenamide, 4-pentenamide, oleamide, vinylbenzamides (ortho, meta and para), 3-cyclohexene-1-carboxamide, N-crotylmaleimide, N-crotylphthalimide, N-allylphthalimide; the following acetals: 4-pentenaldehyde diethyl acetal, 1,2,5,6-tetrahydrobenzaldehyde diethyl acetal, 3-hexendial tetramethyl acetal, p-vinylbenzaldehyde dibutyl acetal, acetaldehyde diallyl acetal; and the following phosphoric esters: di-(2-butenyl) 2-ethylhexyl phosphate, tri-(crotylphenyl)phosphate, allyl diphenyl phosphate, dioctyl 3-pentenyl phosphate.

3. A process for making oxirane compounds which comprises the steps of reacting propionaldehyde in solution in an inert solvent with oxygen at a temperature below 15° C. to form propionaldehyde monoperpropionate and thereafter reacting the propionaldehyde monoperpropionate with an organic compound containing at least three carbon atoms and at least one ethylenic group, >C=C<, in the liquid phase at a temperature between 25° C. to about 200° C.; said ethylenically unsaturated organic compound being of the group consisting of the following hydrocarbons: propylene, butylenes, pentenes, hexenes, octenes, butadiene, isoprene, pentadienes, hexadienes, heptadienes, octadienes, styrene, vinylcyclohexenes, divinylbenzenes, dihydronaphthalenes, indene, stilbene, 1-phenyl-1-propene, cyclopentene, cyclopentadiene, dicyclopentadiene, methyl cyclopentene, methylene cyclohexane, up to and including ethylenically unsaturated macromolecules of butadiene polymers and copolymers; the following chlorinated hydrocarbons: allyl chloride, methallyl chloride, 1,4-dichloro-2-butene, 3,4-dichloro-1-butene, 3-chloro-1-butene, crotyl chloride, crotyl fluoride, crotyl bromide, o-chlorostyrene, p-chlorostyrene, m-chlorostyrene, chloromethyl styrenes (ortho, meta and para), 1-chloro-3-vinylcyclohexane, 4-(trichloromethyl)-1-cyclohexene, tetra-(chloromethyl)-ethylene, 1-chloro-4-fluoro-2-butene, p-bromobenzylethylene; the following alcohols and phenols: allyl alcohol, cinnamyl alcohol, 3-cyclohexenyl methanol, p-allyl phenol, p-crotyl phenol, dicrotyl phenols, 4-methylenecyclohexanol, 3-penten-1-ol, 5-decen-1-ol, 9-octadecen-1-ol; the following ethers: diallyl ether of diphenylol methane, diallyl ether of 2,2-diphenylol propane, diallyl ether, butyl crotyl ether, 2-pentenyl butyl ether, 4-pentenyl butyl ether, o-allylphenyl ethyl ether, 2,4-diallylphenyl ethyl ether, 3-cyclohexenylmethyl alkyl ethers, 3-cyclohexenylmethyl aryl ethers; the following carbonylic compounds: oleic acid, soybean oil, linseed oil, mesityl oxide, allyl acetate, 3-cyclohexenylmethyl esters, 3-cyclohexenylmethyl acetate, 3-cyclohexenmethyl acrylate, 3-cyclohexenmethyl methacrylate, 2-ethylhexyl oleate, glycol dioleate, p-vinyl benzaldehyde, 4-decenoic acid, methyl allyl ketone, methyl-2-pentenyl ketone, diallyl maleate; the following nitrogen-containing compounds: 3-pentenenitrile, 4-cyanocyclohexene, vinylbenzonitriles (ortho, meta and para), 3-pentenamide, 4-pentenamide, oleamide, vinylbenzamides (ortho, meta and para), 3-cyclohexene-1-carboxamide, N-crotylmaleimide, N-crotylphthalimide, N-allylphthalimide; the following acetals: 4-pentenaldehyde diethyl acetal, 1,2,5,6-tetrahydrobenzaldehyde diethyl acetal, 3-hexendial tetramethyl acetal, p-vinylbenzaldehyde dibutyl acetal, acetaldehyde diallyl acetal; and the following phosphoric esters: di-(2-butenyl) 2-ethylhexyl phosphate, tri-(crotylphenyl)phosphate, allyl diphenyl phosphate, dioctyl 3-pentenyl phosphate.

4. A process according to claim 1 in which the oxidation of the aldehyde is carried out under the influence of actinic light having wave lengths below 4000 A. acting on the reaction mixture.

5. A process according to claim 1 in which the oxidation of the aldehyde is carried out in the presence of a small amount of a cobalt compound in the reaction mixture.

6. A process according to claim 1 in which the oxidation of the aldehyde is carried out in the presence of a small amount of ozone in the reaction mixture.

7. A process according to claim 2 in which the oxidation of the aldehyde is carried out under the influence of actinic light having wave lengths below 4000 A. acting on the reaction mixture.

8. A process according to claim 3 in which the oxidation of the aldehyde is carried out under the influence of actinic light having wave lengths below 4000 A. acting on the reaction mixture.

9. A process according to claim 2 in which the oxidation of the aldehyde is carried out in the presence of a small amount of a cobalt compound in the reaction mixture.

10. A process according to claim 3 in which the oxidation of the aldehyde is carried out in the presence of a small amount of a cobalt compound in the reaction mixture.

11. A process according to claim 2 in which the oxidation of the aldehyde is carried out in the presence of a small amount of ozone in the reaction mixture.

12. A process according to claim 3 in which the oxidation of the aldehyde is carried out in the presence of a small amount of ozone in the reaction mixture.

References Cited in the file of this patent

UNITED STATES PATENTS

| | | |
|---|---|---|
| 2,152,003 | Peski et al. | Mar. 28, 1939 |
| 2,567,930 | Findley | Sept. 18, 1951 |
| 2,581,464 | Zech | Jan. 8, 1952 |

OTHER REFERENCES

Swern: Chem. Rev., pp. 1–9, 16–25, vol. 45 (1949).
Beilstein: vol. 17, p. 54 (1934).
Paget: J. Chem. Soc., 1938, 829–33.